Patented Dec. 13, 1938

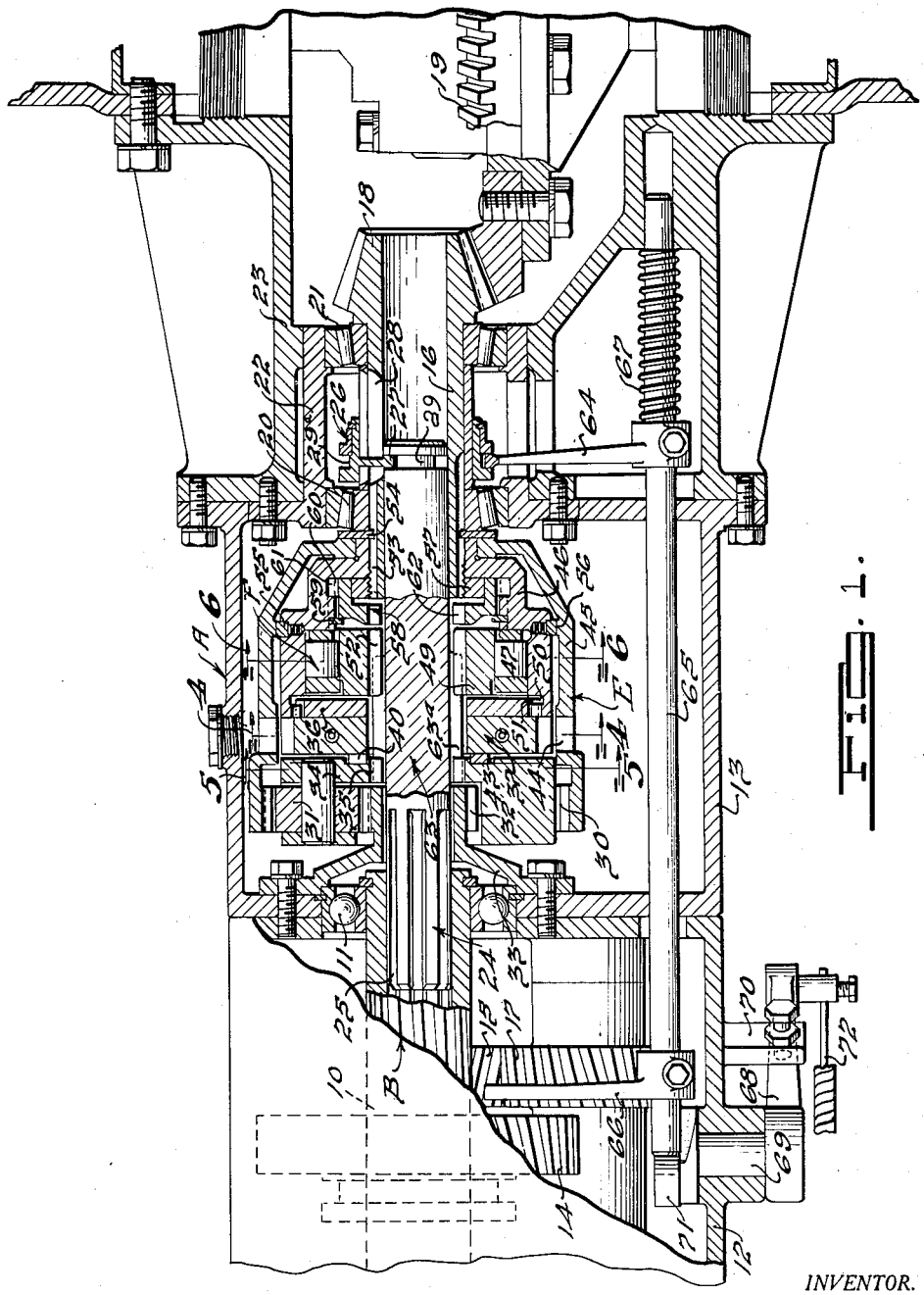

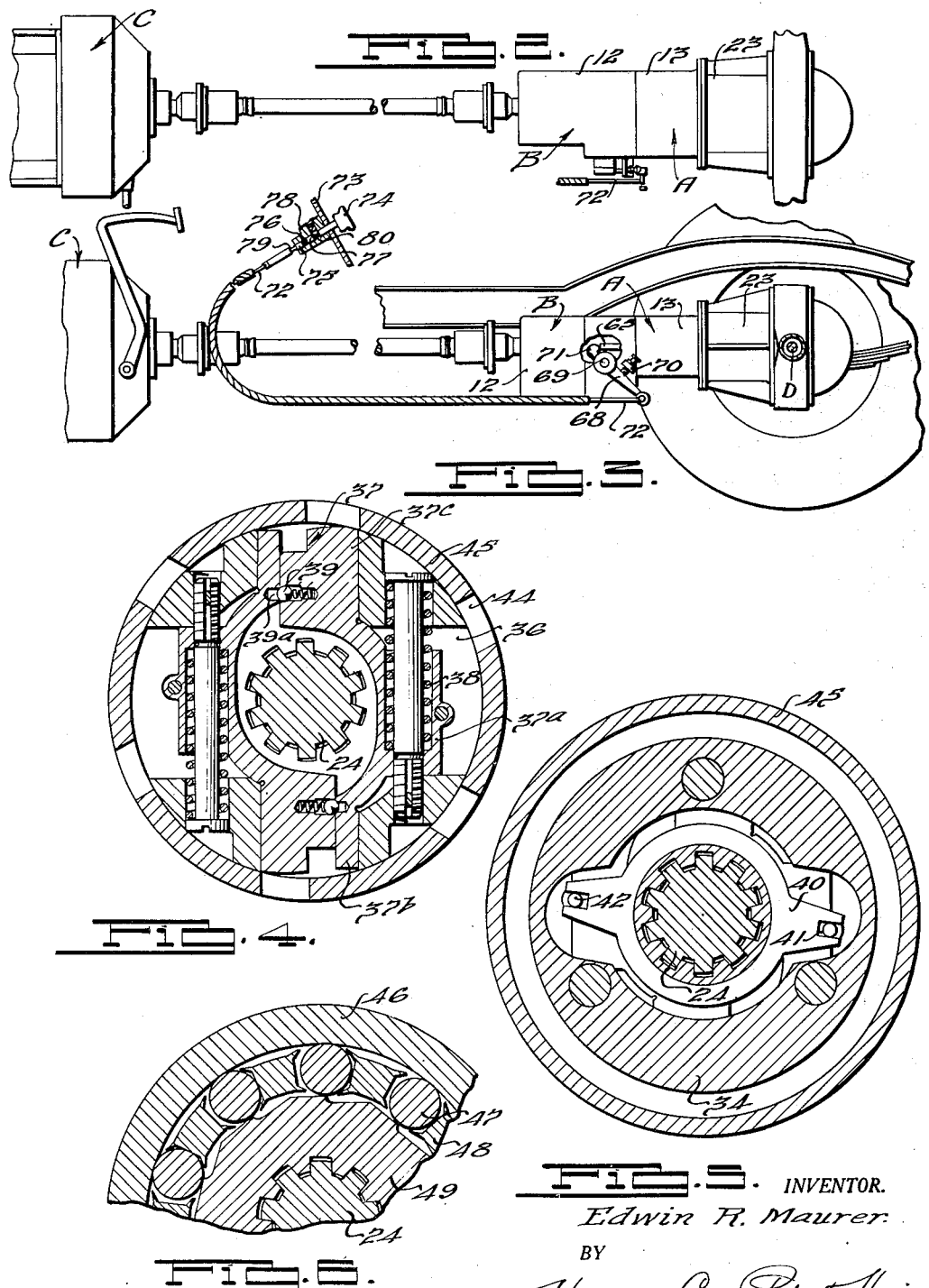

2,139,764

UNITED STATES PATENT OFFICE 2,139,764

POWER TRANSMISSION

Edwin R. Maurer, Detroit, Mich., assignor to Chrysler Corporation, Highland Park, Mich., a corporation of Delaware Application December 2, 1936, Serial No. 113,771

13 Claims. (Cl. 74—260)

This invention relates to power transmissions and refers more particularly to improvements in speed ratio changing mechanism especially adapted for use in driving motor vehicles.

One object of my invention is to provide an improved speed ratio changing mechanism preferably providing an overdrive, or a speed greater than 1 to 1 between driving and driven shafts in the transmission of power from the engine to the vehicle ground wheels.

More particularly, further objects of my invention are to provide a mechanism of the character aforesaid having improved characteristics of long life, quietness of operation, automatic response to the vehicle travel, and relatively low manufacturing cost.

Another object of my invention in the more limited aspects thereof is to provide an automatic mechanism of this nature which is particularly adapted to be positioned in a motor vehicle drive with a conventional transmission near the driving axle. Thereby the speed of the propeller shaft can be reduced so that it rotates at engine speed when my overdrive is engaged; furthermore, a more desirable weight distribution may be effected for the vehicle suspension. However, my automatic overdrive may be positioned, by a few minor changes, near the driving axle although the transmission be mounted elsewhere in the vehicle drive.

A further object of my invention is to provide an improved arrangement of automatic overdrive mechanism between driving and driven shafts incorporating an overrunning clutch action between the shafts during the normal drive and wherein this overrunning action readily synchronizes the relative movement of the elements of the automatic clutch at or above a predetermined speed of rotation of one of its clutching members, after which time this overrunning action ceases.

Further features of my invention reside in an improved means for controlling the operation of the overdrive unit whereby the automatic clutch and the overrunning clutch may be simultaneously or separately rendered ineffective.

Another feature of my invention, as shown in one embodiment thereof, is an improved means for controlling the operation of the overdrive unit whereby the automatic clutch and the overrunning clutch may be simultaneously rendered inoperative and the centrifugal force operated element is prevented from moving toward its clutching position.

Additional objects of my invention reside in the provision of a novel overdrive mechanism preferably employing planetary gearing and an overrunning direct drive clutch wherein one member of the automatic clutch, preferably the centrifugally actuated member, is shifted in a novel manner in locking out the overrunning clutch and axially separating the normal alignment of the automatic overdrive clutch structures.

Further objects and advantages of my invention will be more apparent from the following detailed description of several illustrative embodiments of my invention, reference being had to the accompanying drawings, in which:

Fig. 1 is a sectional elevational view of my overdriving mechanism.

Fig. 2 is a diagrammatic plan view of my overdriving mechanism and a conventional changespeed transmission interposed in the vehicle drive between the motor and the driving rear axle, and positioned next to the rear axle.

Fig. 3 is a diagrammatic elevational view of the mechanism shown in Fig. 2, and illustrating the remote control for my overdriving mechanism.

Fig. 5 is a transverse sectional elevational view taken approximately as indicated by the line 5—5 in Fig. 1.

Fig. 6 is a detail sectional view taken as indicated by the line 6—6 of Fig. 1.

Fig. 7 is a partial sectional elevational view corresponding to Fig. 1 but illustrating a modified form of my overdriving mechanism.

Figure 4:
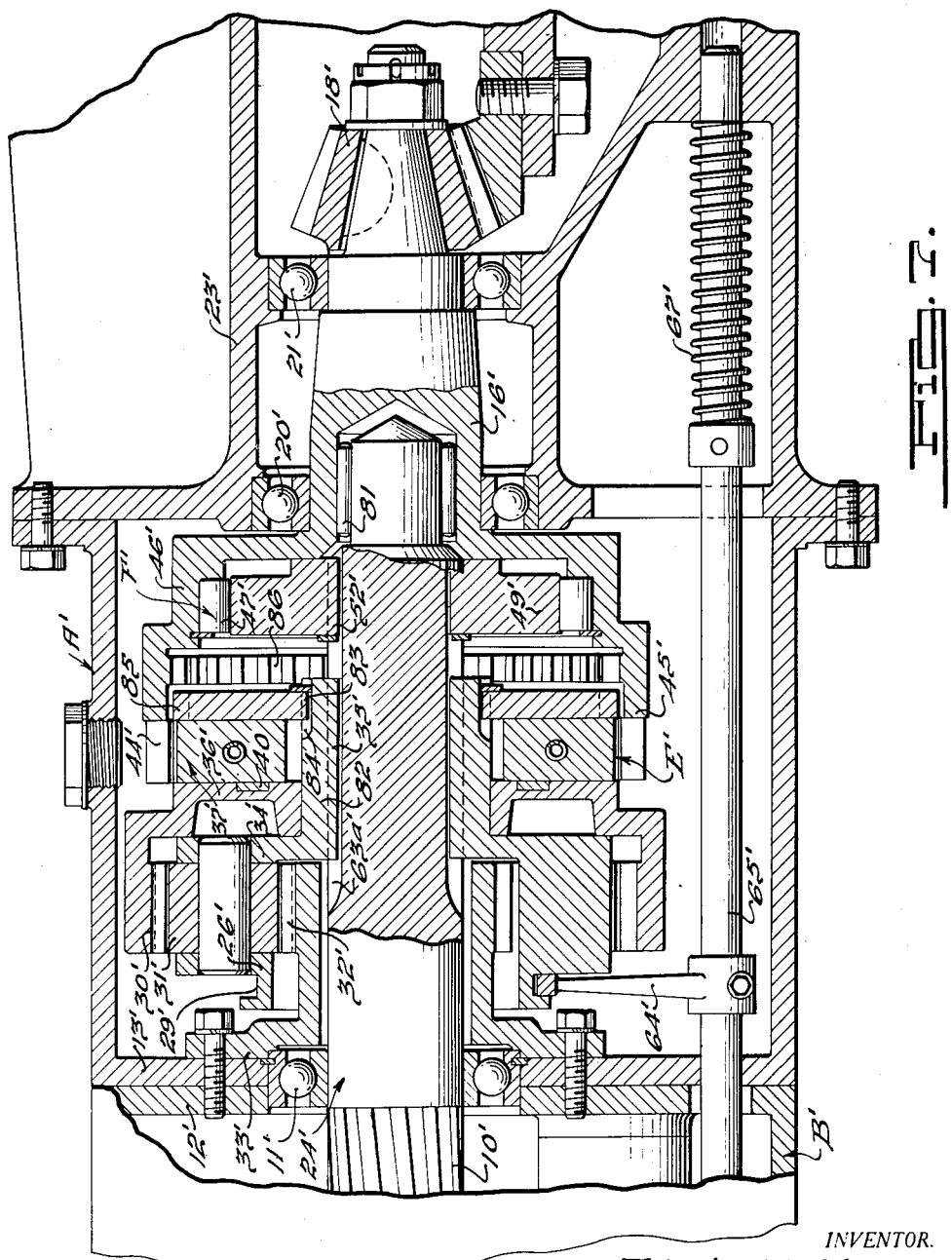
Fig. 4 is a transverse sectional elevational view taken approximately as indicated by the line 4—4 in Fig. 1.

Referring to the drawings, I have illustrated my overdriving mechanism A interposed with a conventional change speed transmission B in the vehicle drive between the vehicle clutch C and the driving axle D, and attached to said axle, the clutch and the transmission being drivingly connected by the conventional propeller shaft, it being understood that I have elected to show my invention in association with a motor vehicle drive although in its broader aspects it is not necessarily limited thereto.

Furthermore, my driving mechanism may be used to advantage at various other points in the line of general power transmission between the vehicle engine and the driven wheels, or between driving or driven means, such as shafts of other types of devices.

The transmission B may be of any suitable type, such as the conventional selector type operated in the well known manner through selector controls whereby the various adjustments may be made to the transmission in order to provide speed ratios including reverse, in the line of drive through the transmission.

Inasmuch as transmission B may, for the most part, be of general conventional construction and operation, I have shown only a portion of the gearing of this transmission in Fig. 1. The power coming from the usual engine or other prime mover forwardly of transmission B, drives the transmission, a splined power transmitting shaft 10 of which is rearwardly journalled in a bearing 11 carried by a transmission casing 12 and an overdrive casing 13. Mounted on the shaft 10 is a low speed and reverse gear 14 adapted to be shifted by the usual reverse selector control rearwardly or to the right, as viewed in Fig. 1, for engagement with the usual reverse idler 15 in order to effect a reverse drive from the normal direction of drive to a driven shaft 16 in the overdriving mechanism A. This idler gear 15 constantly meshes with the usual countershaft reverse gear 17. Thus, by appropriate actuation of the usual transmission controls, gears 14 and 15 may be engaged to reverse the drive, it being understood that other manipulations of the transmission mechanism are adapted to selectively produce other desired speed ratio changes in the normal direction of rotation for the driven shaft 16.

The rearward portion of the driven shaft 16 preferably has formed thereon a drive pinion 18 meshing with a drive gear 19 to thereby drive the vehicle wheels through the rear axle D in the conventional manner, and is suitably journalled in bearings 20 and 21 carried by an extension 22 of a rear axle differential casing 23.

The power is taken from the transmission B by a power driving means or shaft 24 which has splines 25 formed on the forward portion thereof which is drivingly piloted by the rear end portion of the shaft 10.

A shiftable sleeve 26 is mounted on the driven shaft 16 and has an inwardly extending fork portion 27 formed thereon which moves fore and aft in a slot 28 on shaft 16. The fork 27 engages a shifting collar or groove 29 formed on the rear portion of the driving shaft 24 which is piloted by the forward portion of the driven shaft 16.

A planetary gear train is positioned rearwardly of the bearing 11 consisting of an annulus gear 30 having planet gears 31 meshing with a sun gear 32, in this case fixed by brackets 33 to the casings 13 and 12. The planet gears 31 are supported by a carrier 34 having internal splines 35 which are adapted to engage the driving shaft 24.

Journalled rearwardly of the carrier 34 on the shaft 24 is a rearwardly extending pawl cage 36 incorporating one or more pawls 37 of an automatic clutch E.

This automatic clutch may be of the type wherein the pawls 37 are yieldingly urged inwardly to their disengaged or declutched positions by springs 38. If desired, each pawl 37 may be provided with a spring actuated ball detent 39 releasably engaging a recess 39ᵃ to assist in holding the pawls in stabilized condition and to prevent hunting prior to their release for outward clutching movement. At a predetermined desired speed of rotation of the pawls, centrifugal force will cause outward movement of the pawls, overcoming the action of the springs 38, whereby the pawls will be projected for engaged or clutched positions. Each pawl 37 may have a yoke portion 37ᵃ extending substantially around the shaft 24 and terminating in a counter-balancing guide end portion 37ᵇ substantially diametrically opposite a clutching end portion 37ᶜ of each pawl.

If desired, each pawl 37 may be interconnected by an equalizer ring 40 mounted between the planet carrier 34 and pawls 37, best shown in Fig. 5, surrounding driving shaft 24 and having diametrically arranged outwardly opening slots 41 for respectively receiving pins 42. One of the pins is carried by each pawl yoke portion 37ᵃ and the ring 40 is rotatably guided by a groove 43 in the rearwardly face of the carrier 34. The pawls 37 are thus tied together for equalizing or synchronizing the action of the pawls so that they will move outwardly and inwardly in unison.

Slots 44 of a cylindrical shell 45, formed as a rearward extension of the annulus gear 30, are so arranged in Fig. 1 that these slots will telescope the pawl cage 36.

An overrunning clutch F is mounted rearwardly of the cage 36 on shaft 24. A cylindrical member 46 receives therein rollers or cylinders 47 which are maintained in their properly spaced relationship by a spacer ring 48, and a driving cam member 49. This cylindrical member is drivingly connected with the pawl cage 36 by reason of its internal teeth 50 engaging external teeth 51 formed on the periphery of the cage. The cam member 49 is adapted to be continuously drivingly connected by its internal splines 52 to the driving shaft 24, as will presently be apparent.

The cylindrical member 46 extends rearwardly and is drivingly connected with splines 53 of the driven shaft 16. Shell 45 telescopes the member 46 and is rotatably journalled thereon, a suitable stop such as snap-ring 54, carried by shaft 16, preventing rearward movement of the members 45 and 46.

Distributed circumferentially on the member 46 are a plurality of releasable detents or friction shoes 55 which may be used, if desired to engage a track portion 56 formed on the inner surface of the shell 45, thereby effecting easier and quieter shifting of the sleeve 26 forwardly to its position of Fig. 1 as will hereinafter be more apparent.

The forward portion of the shaft 16 is threaded to receive thereon a nut 57, a hexagon nut being shown in this embodiment, which is adapted to maintain the member 46 snugly against the snap-ring 54.

A jaw clutch 58 is preferably supported and prevented from moving rearwardly by a portion of member 46, a suitable locking ring 59 on this member 46 holding the clutch 58 against forward movement. The clutch 58 is drivingly connected with the member 46 through its external teeth 60 which engage internal teeth 61 of this member 46. Formed on the clutch 58 are internal splines 62 by which this clutch is adapted to be selectively drivingly connected with the driving shaft 24.

Formed on the central portion of the shiftable driving shaft 24 is a shiftable clutch device 63 having longitudinally extending splines 63ᵃ. These splines 63ᵃ are of such length and so positioned on shaft 24 that they simultaneously engage the internal splines 35 of the planet carrier 34 and the internal splines 52 of the cam member 49, but not the internal splines 62 of the jaw clutch 58, which will be designated as the overdrive or forward position. When the clutch 63 is shifted rearwardly to move its splines 63ᵃ just out of engagement with the internal splines 35, these splines 63ᵃ then engage only the internal splines 52, which will hereinafter be referred to as the overrunning drive or intermediate position. Upon further rearward movement of the clutch 63, its splines 63ᵃ remain in engagement with the splines 52 but also engage the internal splines 62—to be referred to as the two-way drive or rearward position. This shifting of clutch 63 to the forward, intermediate, and rearward positions is effected by selective positioning of the shiftable sleeve 26 as will presently be apparent.

The planetary set is thus adapted to rotate the slots 44 from and at a speed greater than that of the driving shaft 24, whereas the pawl cage 36 is driven directly from the driven shaft 16 with the parts in the Fig. 1 position.

With clutch 26 positioned as shown, shaft 24 drives shaft 16 through the overrunning clutch F until, at or above the critical speed, pawls 37 are projected outwardly for engagement with slots 44, and such engagement will occur when the slots and pawls are substantially synchronized.

Synchronization is effected by decreasing the speed of the driving shaft, as by releasing the usual accelerator pedal and allowing the driven shaft 16 to overrun the driving shaft 24 by reason of the overrunning clutch F.

When the automatic clutch E engages for providing a two-way positive drive through the planetary gear train, the overrunning clutch F is ineffective and continues to be so until the pawls are retracted by reason of their rotation below the critical speed.

Means have been provided for selectively shifting the clutch device 63 to its aforesaid forward, intermediate, and rearward positions. A shifter fork 64 engages a collar 29ᵃ and is fixed to a horizontal shaft 65 slidably supported longitudinally by the casings 12, 13 and 23. An arm 66 is fixed to the forward portion of the shaft 65 and has its other end in the path of action of the slidable low speed and reverse gear 14. The shaft 65 is yieldingly urged forwardly to its Fig. 1 position by a spring 67 whenever gear 14 is not engaged for reverse drive and whenever a dash control—to be described later—is not actuated. The arm 66 is so positioned that when it is moved by the gear 14, the clutch 26 will be shifted sufficiently to cause the splines 63ᵃ of clutch device 63 to engage the internal splines 52 and 62, to thereby provide a direct two-way drive.

Further means for shifting clutch device 63 has been incorporated which is independent of the aforementioned reverse gear control. A lever 68 is mounted on a shaft 69 extending rotatably through casing 12, the lower face of the lever engaging a suitable remote control, in my drawing a Bowden wire dash control, the details of which will be presently set forth. A stop 70 formed as part of the casing 12 prevents upward movement of the end of lever 68 beyond its position of Figs. 1, 3. The portion of the shaft 69 inside the casing 12 has an actuating arm 71 attached thereto which has an end portion adapted to contact the forward end of the shaft 65.

Rearward shifting of clutch device 63 to its rearward position is effected when gear 14 is moved to reverse drive position. The free end of the arm 66 extends into the path of movement of gear 14 when the latter is moved rearwardly for engagement with the reverse idler gear 15, as earlier described. The arrangement is that when the gear 14 is shifted from its Fig. 1 or forward position into engagement with gear 15 to establish the reverse drive, the horizontal shaft 65 is moved rearwardly to simultaneously cause the clutch device 63 to go to its two-way drive or rearward position. Such rearward movement of clutch device 63 renders the automatic clutch E and the overrunning clutch F inoperative, thereby providing a two way direct drive between the shafts 24 and 16. During the aforesaid movement of shaft 65, spring 67 is compressed so that on release or forward movement of gear 14, the parts will be restored to positions thereof illustrated provided, however, that the aforementioned remote control is positioned to accommodate such return movement as will be presently apparent.

In addition to the aforesaid manually operated means for shifting the clutch 26 to its rearward position in response to a setting of the reverse gearing of the transmission B, I have also provided a further manually controlled means for shifting the clutch 26, at times when permitted by my improved controlling means, independently of the movement thereof under the influence of the reverse setting of the transmission. To this end a Bowden wire 72, as diagramatically illustrated, extends forwardly from lever 68 for convenient manipulation by the vehicle driver, such position being indicated by the usual dash 73 which mounts a handle or knob 74 connected to the other end of the Bowden wire 72. This handle is adapted for movement by the hand of the vehicle driver, this handle being guided from its illustrated overdrive position to two other positions in spaced relationship from dash 73, which will be referred to as the overrunning and the two-way drive positions. In this overrunning position a guide portion 75 registers a notch 76 thereof with a spring-pressed ball 77 carried by a guide block 78, whereas in the two-way drive position this ball registers a notch 79.

The ball 77 and the notches 80, 76 and 79 engageable therewith cooperate to advise the operator of the proper positioning of handle 74 for effecting the desired movement of the clutch device 63. When the handle 74 is positioned in its overdrive or forward station of Fig. 3, clutch device 63 is in its Fig. 1 position to thereby provide a releasable direct drive between the shafts 24 and 16 through the intermediary of the overrunning clutch F until the automatic clutch E engages as earlier described.

It will be noted that when the handle 74 is pulled outwardly from the dash 73 to its overrunning drive position, the lever 68 will move rearwardly to actuate the shaft 65 and thus shift the clutch device 63 to its overrunning drive or intermediate position. The automatic clutch E is thereby rendered ineffective, and the shafts 24 and 16 are provided with a releasable one-way direct drive through the cam member 49, rollers 47, and cylindrical member 46 of the overrunning clutch F.

When the handle is pulled outwardly from the dash 73 still further to its two-way drive position, the lever 68 will move rearwardly to force the shaft 65 rearwardly still further against spring 67 and thereby shift the clutch device 63 to its two-way drive or rearward station. It will be apparent that when arm 66 has been moved rearwardly by the gear 14, the positioning of the handle 74 will have no effect inasmuch as the actuating arm 71 will not contact the shaft 65 which has already been moved rearwardly. It should also be noted that if the handle 74 is moved to its two-way drive station, the gear 14 will not contact the arm 66 when shifted rearwardly by the vehicle driver. With the clutch device 63 in its two-way drive position, the automatic clutch E and the overrunning clutch F are ineffective and a two-way drive is provided between shafts 24 and 16 through the intermediary of the jaw clutch 58 and cylindrical member 46.

When the control members are positioned as in Figs. 1 and 3, the clutch device 63 is in its forward or normal position. The driving shaft then drives the driven shaft 16 through the members 49, 47 and 46 of the overrunning clutch F. However, when the automatic clutch E is engaged the drive between the driving and the driven shaft will be accomplished with an overdrive action or increase in speed of the driven shaft over the driving shaft. This engagement of the automatic clutch is effected under the conditions described earlier by momentarily slowing down the speed of the driving shaft 24 to synchronize the speeds of the slots 44 and pawls 37. This overdriving action passes from shaft 24 to shaft 16 through the intermediary of the planet carrier 34, planet gears 31, annulus gear 30, automatic clutch E, and cylindrical member 46.

With reference to the function of the friction shoes 55, it is evident that when the clutch device 63 is in either its intermediate or rearward position, its splines 63a are not engaged with the internal splines 35 of the planet carrier 34 which would therefore tend to become and remain stationary. If the internal splines 35 are allowed to remain motionless, the operator can not easily shift the rotating clutch device 63 into engagement with these splines 35. Therefore, to remove this objection, the shoes 55 frictionally contact the track portion 56 to cause the shell 45 to rotate at substantially the same speed as the driven shaft 16, and thereby allowing the operator to quietly and easily shift the clutch device 63 into engagement with the internal splines 35.

Referring to Fig. 7, I have illustrated a somewhat modified arrangement of parts, primarily differing from the Fig. 1 construction in that the pawl cage and a portion of the planetary gear train are shifted as a unit in response to actuation of a shifter fork for rendering the overrunning and the automatic clutches simultaneously inoperative, and that the pawls are ordinarily driven faster than the slots. Primed reference characters have been used to indicate parts of different construction but similar function.

In this modified arrangement, it is apparent that the driving shaft 24' receives the drive from the transmission B' and is suitably journalled, one bearing therefor being shown at 11', while the driven shaft 16' is rotatably journalled by bearings 20', 21' carried by the casing 23'. The driven shaft 16' pilots the rearward end of the driving shaft 24' which is centered therein by a bearing 81.

The planetary gear train is positioned rearwardly of the bearing 11', and consists of the annulus gear 30' having planet gears 31' meshing with the sun gear 32' fixed by the brackets 33' to the casings 12' and 13'.

The planet gears 31' are supported by the carrier 34' having a rearwardly extending sleeve portion 82 slidable longitudinally on shaft 24' and having internal splines 35' in driving engagement with splines 63a' of this shaft.

Journalled rearwardly of the carrier 34' on the sleeve portion 82 is a rearwardly extending pawl cage 36' incorporating the pawls 37' of the automatic clutch E', the annulus gear 30' being drivingly fixed to this cage.

Formed on the rear portion of the cage 36' and drivingly connected by internal splines 83 to external splines 84 of the sleeve portion 82 is an externally toothed clutching member 85.

The shifter collar 29' is fixed to the planet carrier 34' and is adapted to be shifted rearwardly with an assembly consisting of the planet gears 31, annulus gear 30', pawl cage 36', and clutch member 85.

The cam member 49' is drivingly connected through its internal splines 52' to the shaft 24', this cam member being a part of the overrunning clutch F' having the rollers 47' and the cylindrical member 46'. It should be noted that cam member 49' is spaced sufficiently from sleeve portion 82 in the Fig. 7 position of the parts so that on shifting this sleeve portion 82 rearwardly sufficient clearance will be afforded to accommodate this shifting movement.

The member 46' is shown as being integral with the driven shaft 16', its forwardly extending portion carrying a cooperating internally toothed clutching member 86. The furthermost forward portion of the member 46' has formed thereon the slots 44'.

The planetary gear set is thus adapted at all times to rotate the pawls 37' from and at a speed greater than that of the driving shaft 24', whereas the slots 44' are driven directly from the driven shaft 16'.

The means for controlling the movement of the shiftable sleeve 26' is substantially the same as for the previously described embodiment, the fork 64' engaging therewith being actuated either by the movement of the gear 14 or by the dash remote control having two stages in shifting instead of three.

With reference to the operation of this embodiment, with the sleeve 26' positioned as shown, shaft 24' drives shaft 16' through the overrunning clutch F' until at, or above the critical speed, the pawls 37' are projected outwardly for engagement with the slots 44', and such engagement will occur when the slots and pawls are substantially synchronized.

Synchronization is effected by decreasing the speed of the driving shaft, as by releasing the usual accelerator pedal and allowing the driven shaft 16' to overrun the driving shaft 24' by reason of the overrunning clutch.

When the automatic clutch engages, a two-way drive through the planetary gear train is provided, the drive passing between shafts 24' and 16' through the intermediary of planet carrier 34', planet gears 31', annulus gear 30', automatic clutch E', and cylindrical portion 46'—the overrunning clutch being ineffective until the pawls 37' are retracted by reason of their rotation below the critical speed.

Rearward shifting of sleeve 26' by the aforesaid reverse gear control or the remote dash control, moves the clutching member 85 into engagement with the member 86, thereby providing a direct two-way drive between the shafts 24' and 16' through the sleeve portion 82, members 85, 86, and cylindrical member 46'. During this direct two-way drive the automatic clutch E' and the overrunning clutch F' will be rendered ineffective.

Lockout of the automatic clutch is effected by rearward movement of the pawls 37' through the rearward shifting of the sleeve 26'. When these pawls are projected rearwardly, they are out of position for engagement with the slots 44' of the automatic clutch, the shell 45' then closely surrounding the outer ends of the pawls, thereby preventing outward movement of the pawls 37' toward their clutching positions.

When the automatic clutch E' is engaged for the overdrive, it is impossible to shift clutch 26' rearwardly or to the right of the position shown to attempt lockout of the overrunning and automatic clutches for a direct drive, as the pawls 37' will be engaged with slots 44' of the shell 45'.

My mechanism thus provides safety controls protecting the teeth of members 85 and 86 when the automatic clutch is engaged, and also protecting the pawls and slots, and preventing their "ratcheting" action when driving directly through the members 85 and 86 above the critical speed of the automatic clutch.

With my driving mechanism positioned as shown in the illustrated embodiments, the propeller shaft connecting the transmission B and clutch C is never driven by the motor at a rotational speed higher than that of the motor. This advantage effects, among other things, a reduction in noise, vibrations, and weight. Furthermore, a more desirable weight distribution may be had for the vehicle suspension by my positioning.

I furthermore do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. The combination with a driving shaft and a driven shaft, of a planetary gearing for driving said driven shaft at a speed different from that of the driving shaft, and a clutch for connecting one of said shafts with one of the members of the planetary gearing, one of the members of said clutch being connected to one of the gears of said gearing, another member of said clutch being arranged to be drivingly connected to one of said shafts, the members of said clutch being so constructed that engagement will not be effected until the two members approach substantial synchronism, an overrunning clutch including inner and outer clutch elements connected one to said driving shaft and the other to said driven shaft, clutch teeth drivingly connected to each of said shafts, and means for shifting at least one of said clutch members and one of the members of said gearing as a unit to engage said clutch teeth for drivingly connecting said shafts for a two-way direct drive therebetween.

2. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, a clutch controlling said overdriving means, said clutch being adapted to automatically connect said shafts through said overdriving means and the planetary gearing thereof in response to a predetermined speed of rotation of at least one of said shafts, and means for simultaneously shifting one of said automatic clutch and at least one of the members of said gearing to positively couple said shafts for a two-way drive therebetween.

3. In a drive for a motor vehicle having axially aligned driving and driven shafts, overdriving means including gearing between said shafts for driving said driven shaft at a speed greater than that of said driving shaft, said overdriving means further including a speed responsive clutch controlling said gearing, said speed responsive clutch comprising clutching structures respectively drivingly connected to an element of said gearing and to said driven shaft, and means for shifting said gearing-connected clutching structure relative to said driven shaft-connected clutching structure to render said speed responsive clutch inoperative.

4. In a drive for a motor vehicle having axially aligned driving and driven shafts, overdriving means including gearing between said shafts for driving said driven shaft at a speed greater than that of said driving shaft, said overdriving means further including a speed responsive clutch controlling said gearing, said speed responsive clutch comprising clutching structures respectively drivingly connected to an element of said gearing and to said driven shaft, means for shifting said gearing-connected clutching structure relative to said driven shaft-connected clutching structure to render said speed responsive clutch inoperative, and an overrunning clutch comprising clutch members drivingly connected to said driving and driven shafts, at least one of the members of said gearing being displaced axially of said shafts in response to shifting of said gearing-connected clutching structure.

5. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including gearing between said shafts for driving said driven shaft at a speed greater than the speed of the driving shaft, a clutch controlling said overdriving means, said clutch being adapted to automatically connect said shafts through said overdriving means and the gearing thereof in response to a predetermined speed of rotation of at least one of said shafts, and means for simultaneously shifting one of the members of said automatic clutch and at least one of the members of said gearing to positively couple said shafts for a two-way drive therebetween.

6. In a drive for a motor vehicle having a power driving shaft and a shaft driven therefrom and adapted to drive said vehicle, speed ratio driving means including gearing between said shafts for driving said driven shaft at a speed different from the speed of the driving shaft, said driving means further including a speed responsive clutch controlling said drive through said gearing, said clutch including clutching structures one of which is drivingly connected to one of said shafts, means for releasably drivingly connecting the other of said clutching structures to the other of said shafts, and means establishing frictional driving connection between said clutching structures for driving one of said clutching structures from the other when said drive is released by said releasable driving means to said other clutching structure.

7. In a power transmission for a motor vehicle having a power driving shaft and a shaft driven therefrom and adapted to drive the vehicle, releasable clutch means between said shafts for driving said driven shaft directly from said driving shaft and for releasing said drive when said driven shaft overruns said driving shaft, speed ratio driving means including gearing between said shafts for driving said driven shaft at a speed different from the speed of said driving shaft, a clutch controlling said speed ratio driving means, said clutch being adapted to automatically connect said shafts through said speed ratio driving means and the gearing thereof in response to a predetermined speed of rotation of at least one of said shafts, and means for simultaneously shifting one of the members of said automatic clutch and at least one of the members of said gearing to positively couple said shafts for a two-way direct drive therebetween.

8. In a drive for a motor vehicle having axially aligned driving and driven shafts, speed ratio driving means including planetary gearing between said shafts for driving said driven shaft at a speed responsive clutch controlling said gearing, said speed ratio driving means further including a speed response clutch controlling said gearing, said speed responsive clutch comprising clutching structures respectively adapted for driving connection with an element of said planetary gearing and with one of said shafts, and means for shifting said gearing-connected clutching structure relative to said shaft-connected clutching structure to render said speed responsive clutch inoperative.

9. In a drive for a motor vehicle having axially aligned driving and driven shafts, speed ratio driving means including planetary gearing between said shafts for driving said driven shaft at a speed different from that of said driving shaft, said planetary gearing including a planetary gear element and an annulus gear element meshed therewith, said speed ratio driving means further including a speed responsive clutch controlling said gearing, said speed responsive clutch comprising clutching structures respectively adapted for driving connection with one of said gear elements and with one of said shafts, and means for shifting said gear-connected clutching structure relative to said shaft-connected clutching structure to render said speed responsive clutch inoperative.

10. In a drive for a motor vehicle having axially aligned driving and driven shafts, speed ratio driving means including planetary gearing between said shafts for driving said driven shaft at a speed different from that of said driving shaft, said planetary gearing including a planetary gear element and an annulus gear element meshed therewith, said speed ratio driving means further including a speed responsive clutch controlling said gearing, said speed responsive clutch comprising clutch structures respectively adapted for driving connection with said annulus gear element and with one of said shafts, and means for shifting said annulus gear-connected clutching structure relative to said shaft-connected clutching structure to render said speed responsive clutch inoperative.

11. In a drive for a motor vehicle having axially aligned driving and driven shafts, speed ratio driving means including planetary gearing between said shafts for driving said driven shaft at a speed different from that of said driving shaft, said planetary gearing including a planetary gear element and an annulus gear element meshed therewith, said speed ratio driving means further including a speed responsive clutch controlling said gearing, said speed responsive clutch comprising clutching structures respectively adapted for driving connection with said annulus gear element and with one of said shafts, and means for shifting said annulus gear-connected clutching structure together with said annulus and planetary gear elements as a unit relative to said shaft-connected clutching structure to render said speed responsive clutch inoperative.

12. In a drive for a motor vehicle, coaxially arranged driving and driven shafts, one of said shafts being fixed against axial displacement and having a hollow portion thereof slidably piloting an end portion of the other of said shafts, means for supporting the last said shaft for shifting movement in its axial direction, said hollow shaft portion being provided with a slot extending outwardly therethrough, a shift member surrounding said hollow shaft portion and having a part thereof connected with said slidable shaft end portion for shifting said shiftable shaft relative to said fixed shaft, means including a gear train drivingly connecting said shafts for driving said driven shaft from said driving shaft at a speed different from that of said driving shaft, a plurality of sets of clutch teeth respectively drivingly connected to said driving and driven shafts, and means for shifting said shift member to clutch said sets of teeth for coupling said shafts for a two-way direct drive therebetween.

13. In a drive for a motor vehicle, coaxially arranged driving and driven shafts, clutch teeth drivingly connected to one of said shafts, means driven by the other of said shafts and shiftable relative thereto to engage said clutch teeth to connect said shafts for a direct drive therebetween, speed ratio driving means including a gear train for driving said driven shaft from said driving shaft at a speed different from that of said driving shaft, said speed ratio driving means comprising an element having releasable drive connection with said shiftable means and a second element adapted for drive connection with said clutch-teeth-connected shaft, clutching means releasably providing the last said drive connection, and means frictionally driving said second element from the last said shaft to drive the first said element through said gear train when said clutching means is disengaged whereby to facilitate establishment of said releasable drive connection between said shiftable means and the first said element.

EDWIN R. MAURER.

CERTIFICATE OF CORRECTION.

Patent No. 2,139,764. December 13, 1938.

EDWIN R. MAURER.

It is hereby certified that error appears in the printed specification of the above numbered patent requiring correction as follows: Page 6, first column, line 23, claim 8, strike out the words "responsive clutch controlling said gearing" and insert instead different from that of said driving shaft; and that the said Letters Patent should be read with this correction therein that the same may conform to the record of the case in the Patent Office.

Signed and sealed this 25th day of April, A. D. 1939.

Henry Van Arsdale
(Seal) Acting Commissioner of Patents.